United States Patent [19]

Green et al.

[11] 4,268,111
[45] May 19, 1981

[54] FOLDABLE BINOCULARS

[76] Inventors: John R. Green, 3105 E. Harcourt St., Compton, Calif. 90221; Charles D. Turner, 48 Eastfield Dr., Rolling Hills, Calif. 90274

[21] Appl. No.: 70,141

[22] Filed: Aug. 27, 1979

[51] Int. Cl.³ ............................................. G02B 23/18
[52] U.S. Cl. ...................................... 350/70; 350/145
[58] Field of Search ................ 350/70, 140, 145, 250, 350/252

[56] References Cited

U.S. PATENT DOCUMENTS

| | | | |
|---|---|---|---|
| 2,715,853 | 8/1955 | Austin | 350/140 |
| 2,768,554 | 10/1956 | Leslie | 350/140 |
| 2,789,460 | 4/1957 | Kaufman | 350/140 |
| 2,986,830 | 6/1961 | Underberg et al. | 350/140 |
| 3,553,866 | 1/1971 | Redford et al. | 350/140 |
| 3,562,939 | 2/1971 | Jacobs et al. | 350/140 |
| 4,013,341 | 3/1977 | Riley | 350/70 |
| 4,175,828 | 11/1979 | Carver | 350/140 |

*Primary Examiner*—Jon W. Henry
*Attorney, Agent, or Firm*—Fulwider, Patton, Rieber, Lee & Utecht

[57] ABSTRACT

A low-cost folding binocular which may be collapsed to a relatively thin package. The foldable binocular includes a laminated synthetic plastic, pressed paper or cardboard case provided with synthetic plastic objective and eyepiece lenses. The focus adjustment is effected by longitudinal folding of the case along the same fold lines which permit the case to be collapsed. No gluing is necessary.

6 Claims, 10 Drawing Figures

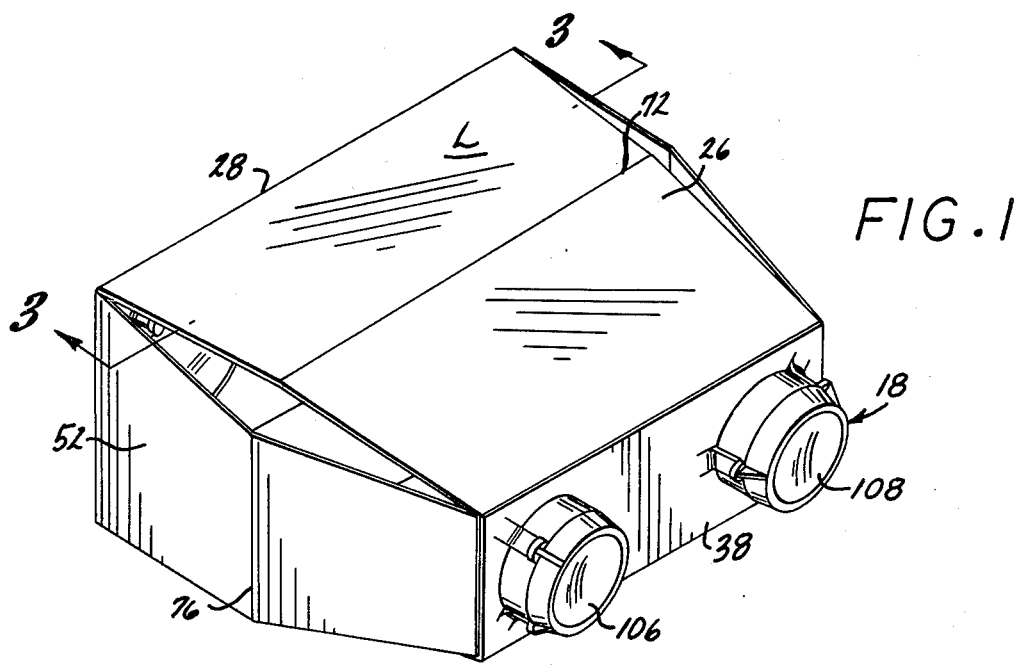
FIG.1
FIG.2
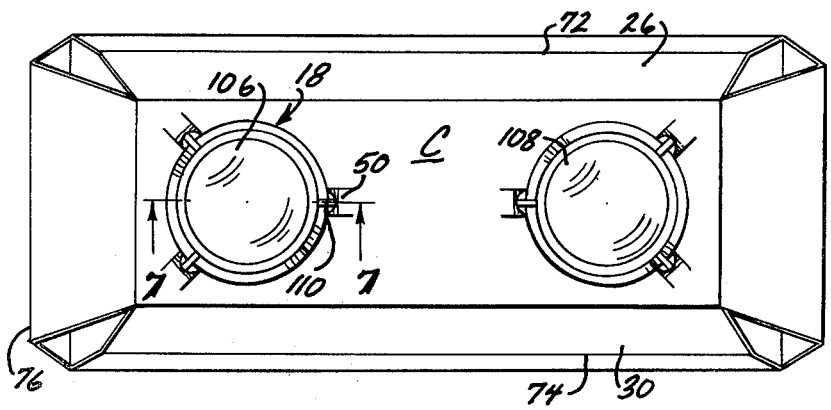
FIG.4
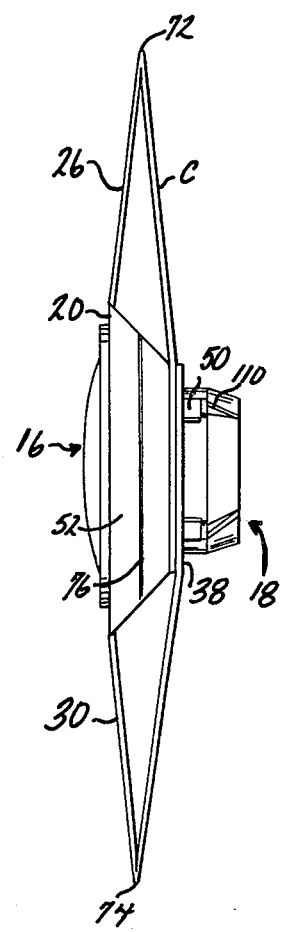
FIG.3
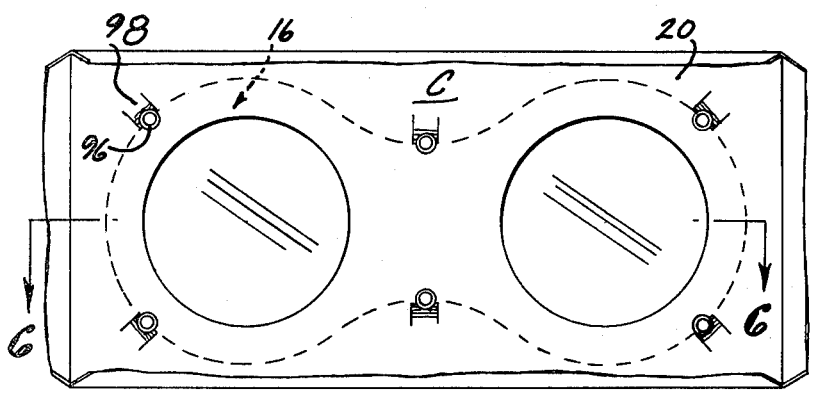

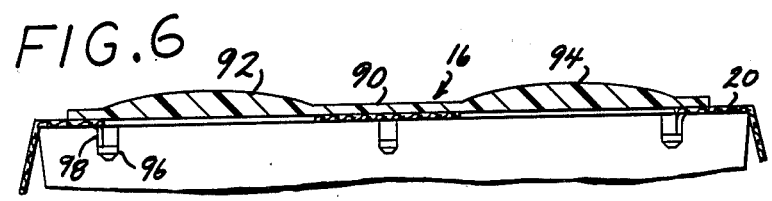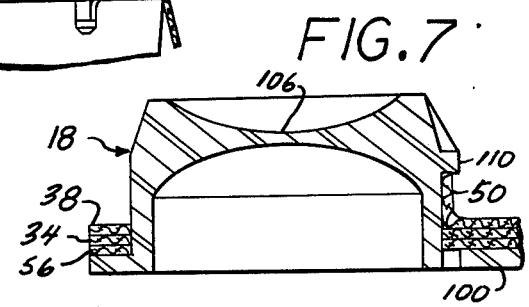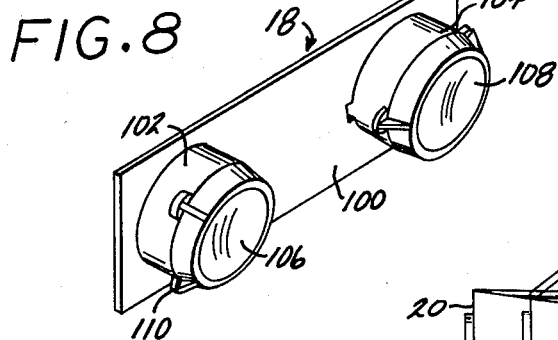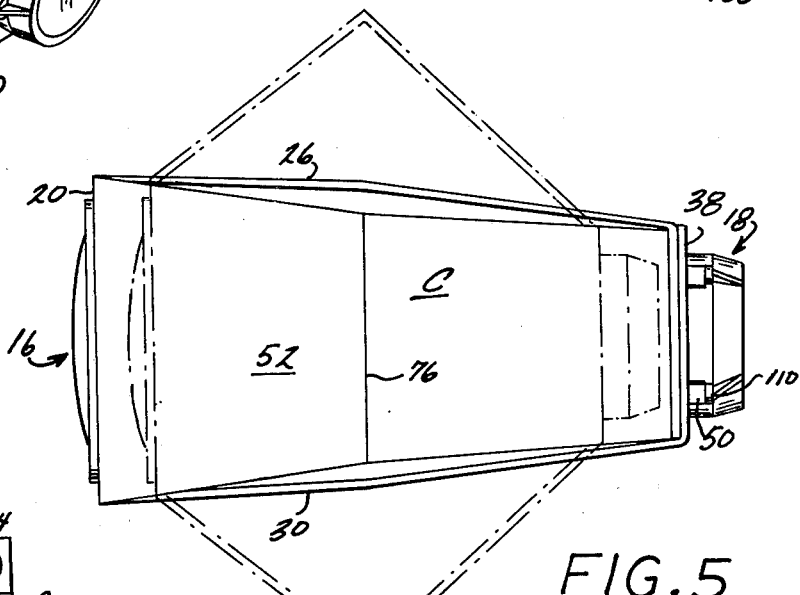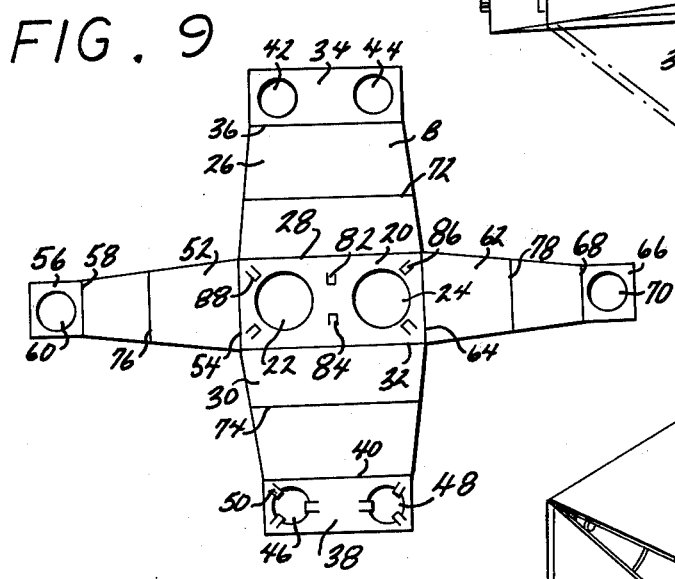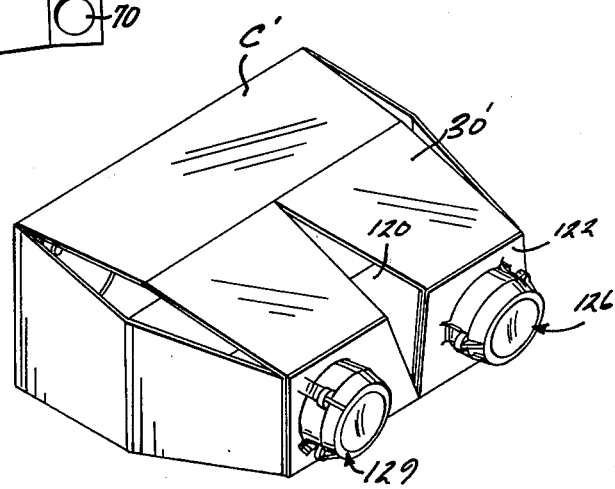

FOLDABLE BINOCULARS

BACKGROUND OF THE INVENTION

The present invention relates generally to the field of optical instruments and more particularly to a foldable binocular which is inexpensive to manufacture and yet which is rugged of construction.

Comparitively low cost binoculars have been heretofore utilized to enhance enjoyment of theater, sports events and the like. Such binoculars are generally rented to the spectators for the particular events. This type of binocular has not generally been of a completely foldable type. One type of foldable binocular is disclosed in U.S. Pat. No. 4,013,341, issued Mar. 22, 1977. Applicant is not aware, however, that the foldable binocular disclosed therein has undergone commercial usage.

SUMMARY OF THE INVENTION

The foldable binocular of the present invention may be readily collapsed to a relatively thin package for storage. Such foldable binocular includes a folded-together case formed from a single blank, with the case being provided with synthetic plastic objective and eye piece lenses. The focus adjustment is effected by longitudinal folding of the case along the same fold lines which permit the case to be collapsed.

It is a particular object of the present invention to provide a foldable binocular having a body formed of a single blank having fold lines defining a front wall, top and bottom walls and side walls, with the adjoining edges between each of the walls and with the intermediate portion of the top and bottom walls and side walls formed with intermediate fold lines. The front and rear walls include a pair of lens apertures which are covered by objective and eyepiece lenses, with focus adjustment of the lenses being made possible by longitudinal folding of the top, bottom and side walls, about the intermediate fold lines, and with the intermediate fold lines also permitting the front and rear walls to be collapsed together to permit storage of the binocular in minimum amount of space.

A further object of the present invention is to provide a foldable binocular of the aforedescribed nature wherein the lenses are formed of cast synthetic plastic and are affixed to the front and rear walls in such a manner as to enhance the rigidity of the binocular.

An additional object of the present invention is to provide a foldable binocular of the aforedescribed nature which may be assembled without the use of an adhesive.

It is another object of the present invention to provide an embodiment of the foldable binocular of the nature set forth hereinbefore wherein the interpupillary distance between the eyepiece lenses may be readily adjusted by transversely squeezing the rear portion of the binocular case together.

These and other objects and advantages of the present invention will become apparent from the following detailed description taken in conjunction with the accompanying drawings.

BRIEF DESCRIPTION OF THE DRAWINGS

FIG. 1 is a perspective view of a preferred form of foldable binocular embodying the present invention.

FIG. 2 is a rear elevational view of said foldable binocular in enlarged scale.

FIG. 3 is a vertical sectional view taken along line 3—3 of FIG. 1.

FIG. 4 is a side elevational view of said foldable binocular in its collapsed position.

FIG. 5 is a side elevational view of said foldable binocular showing how it may be adjusted.

FIG. 6 is a horizontal sectional view taken along line 6—6 of FIG. 3.

FIG. 7 is a horizontal sectional view taken along line 7—7 of FIG. 2.

FIG. 8 is a perspective view of the eyepiece lens panel of said binocular.

FIG. 9 is a plan view in reduced scale showing a blank from which the case of said foldable binocular is formed; and FIG. 10 is a perspective view showing a second form of foldable binocular embodying the present invention.

DESCRIPTION OF THE PREFERRED EMBODIMENT

Referring to the drawings and particularly FIGS. 1–9 thereof, there is disclosed a preferred embodiment of foldable binocular embodying the present invention.

FIG. 9 is a plan view of a blank B from which the case of such foldable binocular is formed. Blank B may be cut from an inexpensive material such as laminated synthetic plastic, pressed paper or cardboard which may be readily folded. The blank B shown in FIG. 9 is adapted to be folded into the case C shown in FIGS. 1–4. When assembled, the front of the case C receives an objective lens panel generally designated 16 and the rear of such case receives an eyepiece lens panel, generally designated 18.

More particularly, blank B includes in its center portion a front wall 20 formed with a pair of like objective lens apertures 22 and 24. A top wall 26 is integral with the upper edge of front wall 20 along a fold line 28. A bottom wall 30 is integral with the lower edge of front wall 20 along a fold line 32. The upper edge of top wall 26 is integral with an inside rear wall 34 along a fold line 36. An outside rear wall 38 is integral with the lower edge of bottom wall 30 along a fold line 40. Inside rear wall 34 is formed with a pair of eyepiece lens apertures 42 and 44, while outside rear wall 38 is formed with a pair of similar apertures 46 and 48. Like tabs 50 are formed in the blank B around the periphery of apertures 46 and 48, the free ends of such tabs extending into the area of such lens apertures. A left side wall 52 is integral with the left edge of front wall 20 along a fold line 54. The rear of left side wall 52 is integral with an inside end wall 56 along a fold line 58. An eyepiece lens aperture 60 is formed in wall 56. A right side wall 62 is integral with the right side of front wall 20 along a fold line 64. The rear of right side wall 62 is integral with an end wall 66 along fold line 68. An eyepiece lens aperture 70 is formed in end wall 66.

The intermediate portion of top wall 26 is formed with a horizontal transverse adjustment fold line 72, while the intermediate portion of lower wall 30 is formed with a similar transverse adjustment fold line 74. The intermediate portion of the left side wall 52 is formed with a vertical adjustment fold line 76, while the intermediate portion of right side wall 62 is formed with a similar adjustment fold line 78. The center portion of front wall 20 is formed with upper and lower tabs 82 and 84, while the left portion thereof is formed with a pair of tabs 86 which extend radially inwardly towards objective lens aperture 22. A similar pair of tabs 88 are formed on the right side portion of front wall 20.

The objective lens panel 16 is preferably molded of an optical grade polystyrene. Such panel generally resembles a figure 8 and includes a flat plate 90 provided with a pair of forwardly extending lenses 92 and 94. A plurality of like mounting pins 96 extend rearwardly from plate 90. As indicated particularly in FIG. 6, the rear ends of each of such mounting pins 96 are provided with offsets 98 for a purpose to be set forth hereinafter. Preferably, the lenses 92 and 94 will be provided with an optically clear finish on both sides while the plate 90 will be provided with a matte finish. Lenses 92 and 94 will preferably have a plano-convex shape.

The eyepiece lens panel 18 is preferably molded of the same optical grade polystyrene from which the objective lens panel 16 is molded. Panel 18 includes a rectangular plate 100 from which extends rearwardly a pair of eyepiece cups 102 and 104. The rear end of such eyepiece cups are provided with a pair of eyepiece lenses 106 and 108. Preferably, lenses 106 and 108 will be provided with an optically clear finish on both sides and will be of double concave configuration, and the remainder of panel 18 will have a matte finish. Referring to FIG. 7, it is important to note that the intermediate portion of each of the eyepiece cups 102 and 104 are formed with three equidistantly spaced transverse offsets 110. It is to be understood that plate 100, eyepiece cups 102 and 104 and eyepiece lenses 106 and 108 are preferably of integral cast construction.

In order to assemble the foldable binocular of the present invention, the blank B will be folded from its flat condition of FIG. 9 to its folded-together position of FIGS. 1–4 so as to define case C. Prior to such folding, however, objective lens panel 16 will be affixed to the exterior surface of front wall 20. This is accomplished by forcing mounting pins 96 through the spaces in front wall 20 originally occupied by tabs 82, 84, 86 and 88. As indicated particularly in FIG. 6, these tabs will thereafter engage offsets 98 of the mounting pins so as to retain the objective lens panel 16 firmly against the exterior surface of front wall 20. Preferably, the tolerances between the mounting pins 96, their offsets 98 and the tabs will be such that an adhesive is not necessary to retain objective lens panel 16 in place.

Thereafter, sidewalls 52 and 62 are folded rearwardly. Similarly, the top and bottom walls 26 and 28 are folded rearwardly. As indicated in FIG. 1, end walls 56 and 66 will be positioned inwardly of rear walls 34 and 38 with rear wall 34 being positioned inwardly of rear wall 38. Prior to such interpositioning of the aforementioned walls, eyepiece lens panel 18 will be held with the rear surface of plate 100 in juxta position with the end walls 56 and 66 and eyepiece cups 102 and 104 will be inserted through the eyepiece lens apertures 60, 70, 42, 44, 46 and 48. As indicated particularly in FIG. 7 and FIG. 8, the tabs 50 of outside rear wall 38 will be sprung rearwardly whereby their extremities will engage the front surface of the offsets 100 of the eyepiece cups 102 and 104. In this manner the eyepiece lens panel 18 will be retained firmly in place. Preferably, the dimensions of the tabs 50 and the eyepiece cups 102 and 104 will be so selected that it will not be necessary to employ an adhesive to retain the walls 34, 38, 56 and 66 together, nor to retain the eyepiece lens panel 18 firmly in place. Instead, the inherent resiliency of the material from which blank B is formed, including the tabs thereof, will maintain the various parts of the binocular in an assembled condition.

In the use of the assembled foldable binocular described hereinbefore, the focus adjustment is readily accomplished by longitudinal folding of the top, bottom and side walls about the intermediate adjustment lines 72, 74, 76 and 78, as indicated in FIG. 5. Referring now to FIG. 4, the case C may be readily collapsed to its folded position by collapsing the case longitudinally along the same adjustment fold lines. When so collapsed, the foldable binocular will be seen to occupy a minimum amount of space. Note that objective and eyepiece lens panels 16 and 18 maintain the rigidity of the front and rear portions of case C.

Referring now to FIG. 10, there is shown a second form of foldable binocular embodying the present invention. The construction of such second form of foldable binocular is similar to that described hereinbefore with respect to FIGS. 1–9 with the exception that the case C is provided with a cut-out portion 120 in the top wall 30' and the rear wall structure. Additionally, the eyepiece lens panel 18 described hereinbefore, is replaced by a pair of eyepiece lens panels generally designated 124 and 126. The construction of such eyepiece lens panels 124 and 126 is in all other respects similar to the construction of eyepiece lens panel 16, and such pair of eyepiece lens panels are retained in place in a similar fashion. The provision of the cutout 120 permits the interpupillary distance between the eyepiece lenses to be adjusted by transversely folding together the rear portion of case C. Focus adjustment and collapsing will be accomplished in the same manner as described hereinbefore.

From the foregoing description it will be seen that the foldable binocular of the present invention will prove particularly useful for spectator events. Additionally, such binocular will appeal to tourists, travelers, campers and the like because of the ready collapsibility feature thereof.

Various modifications and details may be changed with respect to the foregoing detailed description without departing from the spirit of the present invention.

I claim:
1. A foldable binocular, comprising: a case having a front wall formed with a pair of objective lens apertures, top and bottom walls integrally connected to the upper and lower edges of said front wall, with the upper rear edge of said top wall being integral with the upper edge of an inside rear wall and the lower rear edge of said bottom wall being integral with the lower edge of an outer rear wall, left and right side walls integrally connected to the side edges of said front wall, with the rear edges of each side wall being formed with an end wall, all of said walls being formed from a single blank, with the adjoining edges between each of said walls defining fold lines and with the intermediate portion of each of said top and bottom walls being formed with a horizontal transverse adjustment fold line and the intermediate portion of each of said side walls being formed with a vertical adjustment fold line;

eyepiece lens apertures formed in said rear walls and said end walls, with said inner and outer rear walls being butted together and said end walls being butted against the inner surface of said inner rear wall so as to place the eyepiece lens apertures in coincidence and in longitudinal alignment with said objective lens apertures;

objective lens means attached to said front wall having a pair of objective lenses covering said objective lens apertures; and eyepiece lens means attached to said rear walls having a pair of eyepiece lenses covering said eyepiece lens apertures, with focus adjustment of said lens being provided by a longitudinal folding of said top, bottom and side walls about said intermediate fold lines, and with said intermediate fold lines also permitting said front and rear walls to be collapsed together and maintaining their parallelism.

2. A foldable binocular as set forth in claim 1, wherein said objective lens means and said eyepiece lens means are formed with mounting pins which are affixed to said front wall and to said butted-together walls so as to hold said case together and to retain said lens means in place without the use of an adhesive.

3. A foldable binocular as set forth in claim 1, wherein said top wall and said butted-together walls are formed with a notch which permits the rear portion of said case to be transversely folded together so as to vary the interpupillary distance between said eyepiece means to be adjusted.

4. A foldable binocular as set forth in claim 2, wherein said mounting pins are formed with offsets that engage tabs formed on said front wall and on said outer rear wall to retain said lens means in place and to secure said butted-together walls in such butted-together relationship.

5. A foldable binocular as set forth in claim 3, wherein said mounting pins are formed with offsets that engage tabs formed on said front wall and on said outer rear wall to retain said lens means in place and to secure said butted-together walls in such butted-together relationship.

6. A foldable binocular as set forth in claim 4, wherein said lens means each include a plate upon which are formed said mounting pins, with said plates serving to rigidify said front wall and said butted-together walls.

* * * * *